Jan. 30, 1945. J. GALAMB 2,368,133
MOTOR-VEHICLE TOP CONSTRUCTION
Filed Aug. 7, 1941 2 Sheets-Sheet 1
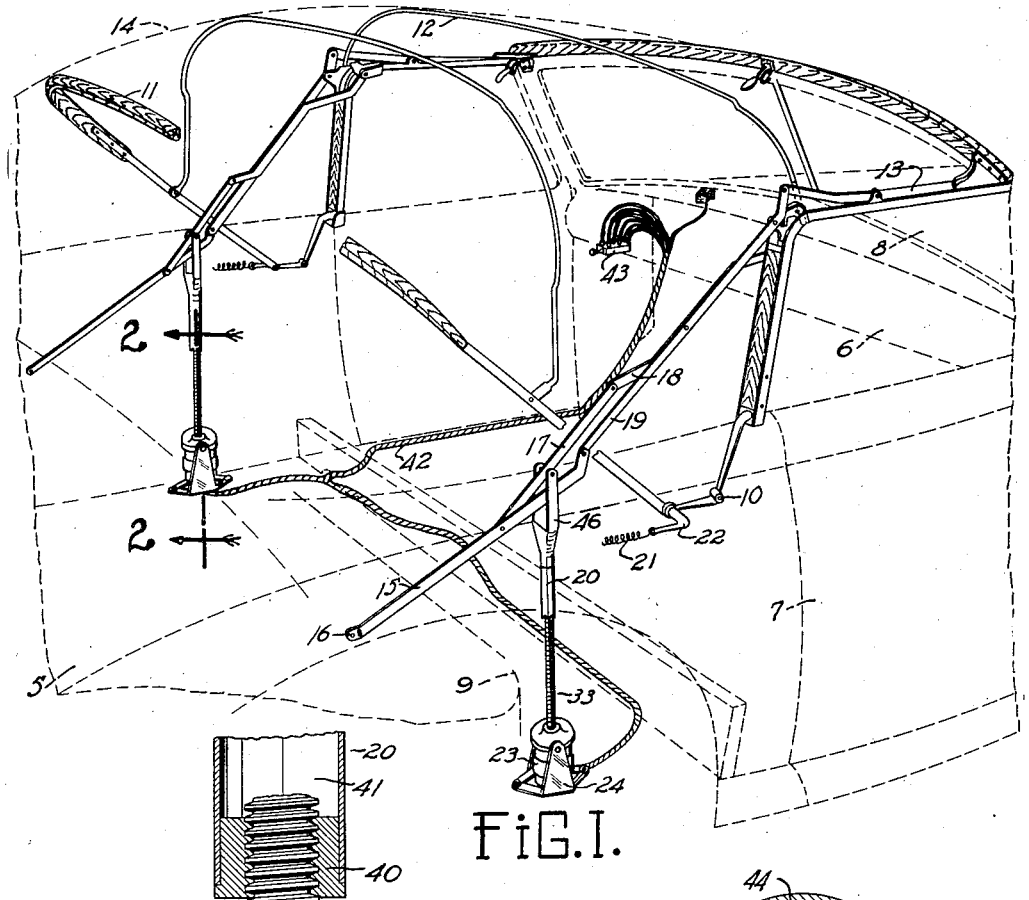
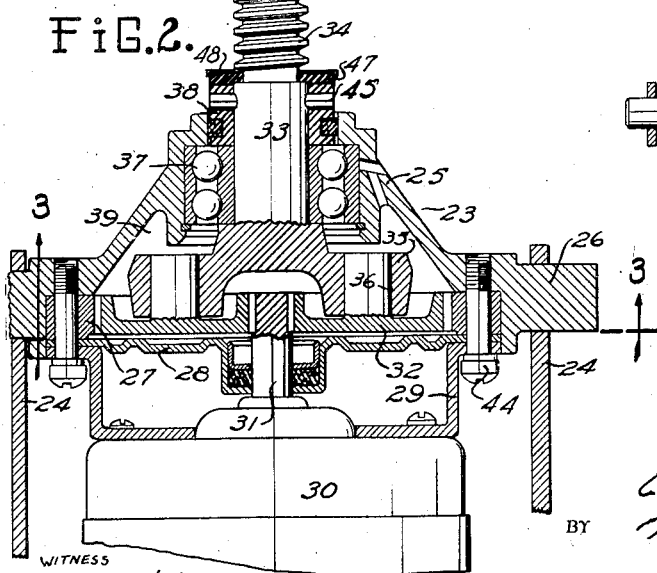
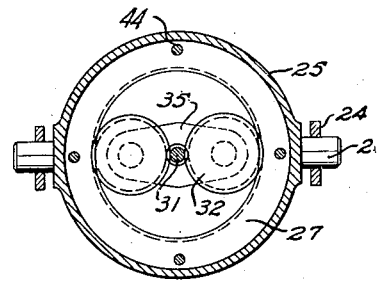
J. Galamb
INVENTOR.
BY E. C. McRae and Robert G. Harris.
ATTORNEYS.
WITNESS William Tilly Jan. 30, 1945. J. GALAMB 2,368,133
MOTOR-VEHICLE TOP CONSTRUCTION
Filed Aug. 7, 1941 2 Sheets-Sheet 2
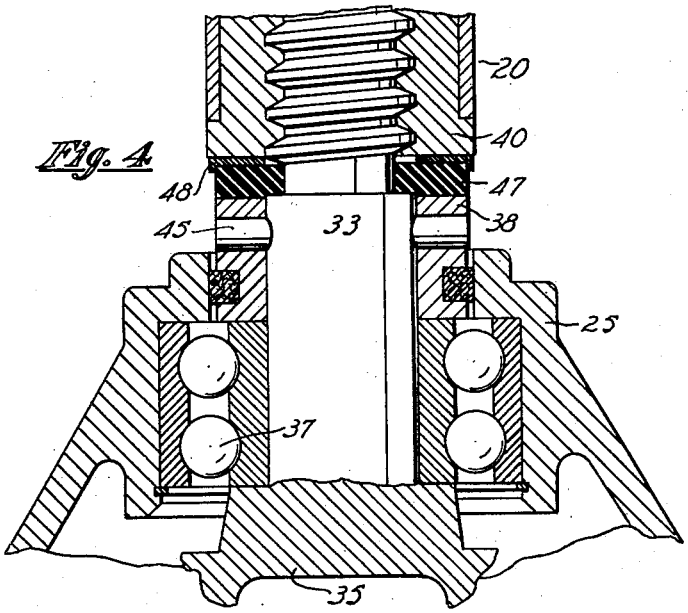
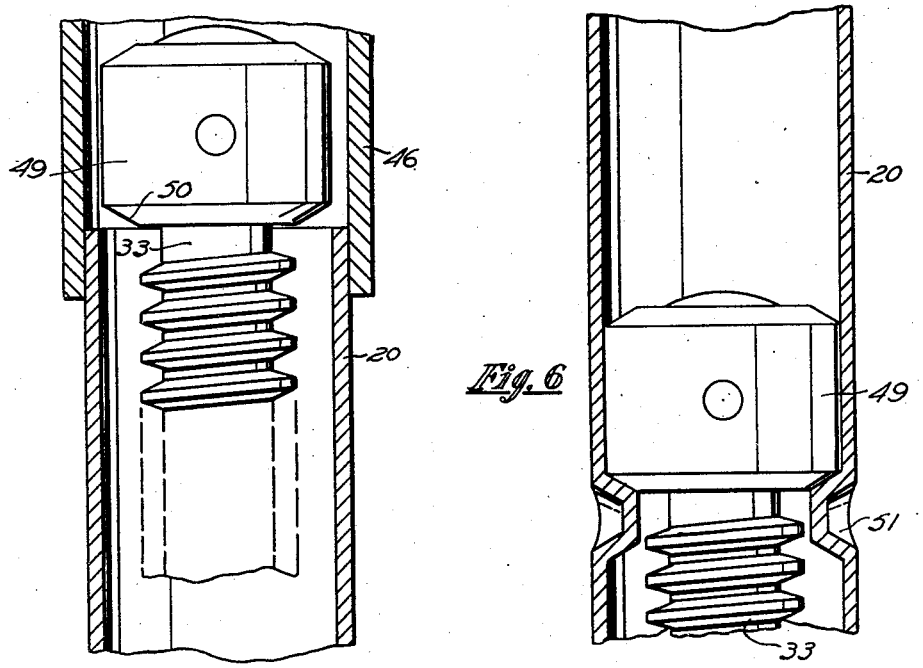
INVENTOR.
J. Galamb
BY E.C. McRae and
ATTORNEYS.

Patented Jan. 30, 1945

2,368,133

UNITED STATES PATENT OFFICE 2,368,133

MOTOR-VEHICLE TOP CONSTRUCTION

Joseph Galamb, Detroit, Mich., assignor to Ford Motor Company, Dearborn, Mich., a corporation of Delaware Application August 7, 1941, Serial No. 405,762

2 Claims. (Cl. 296—112)

This invention concerns a motor-vehicle construction; and, more particularly, an automatic device for raising and lowering automobile tops.

This invention has particular reference to that type of automobile body known as the "convertible," in which the top is formed with a number of bows which swing rearwardly, so that the top may be raised or lowered as desired by the operator. For some time power-operated means have been supplied with such tops so that the operation thereof could be automatically controlled. These power-operating means have included vacuum-operated assemblies of various constructions, as well as electric motors connected through a suitable drive.

This invention concerns the use of such an electric motor and includes the mounting thereof, the gear reduction employed with it and the power transfer means by which the top proper is raised and lowered. Advantages of the electrical motor drive for this service over the vacuum cylinder are: That the former may be operated even when the car motor is not running; while it is not self-locking, it is more resistant and therefore when driving with the top down over rough roads the top inertia will not cause it to bounce up and down; and the operation is more positive. Several disadvantages heretofore encountered in using an electric motor for this service, and which are avoided in the construction disclosed here, are: That an expensive gear reduction was necessarily included; the assembly of motor, reduction gear and drive was too bulky to be readily enclosed in the available space; and the efficiency was so low that a large motor was required.

Other advantages of the device of this invention are: That by utilizing an entirely different principle of construction it may be more economically constructed; be more positive in action; and occupies far less space than any other electrical drive heretofore developed. A further advantage is that by arranging the motor, reduction gear and drive linearly a stronger construction and one less liable to damage is obtained. The construction claimed is easily and quickly assembled and is adapted to be used interchangeably for installations requiring different sized motors or drive shafts or both.

With these and other objects in view, this invention consists of the arrangement, construction and combination of the various parts of my improved device, as described in this specification, claimed in the claims and illustrated in the accompanying drawings, in which:

Figure 1 is a phantom, perspective view of a portion of a motor car showing the elements of the top construction and the improved operating mechanism associated therewith.

Figure 2 is a sectional view on an enlarged scale taken on the line 2—2 of Figure 1.

Figure 3 is a sectional view on a reduced scale taken on the line 3—3 of Figure 2.

Figure 4 is a portion of Figure 2 on an enlarged scale.

Figures 5 and 6 are longitudinal sections through the shaft of the device.

Referring to Figure 1, the car body 5, dash 6, doors 7, windshield 8 and seat 9 are shown in dotted outline, while reference numeral 10 indicates the point at which the vehicle top is hinged and about which it rotates to the open or closed position. The linkage and bow members which make up the top form no part of this invention and will not be described in detail, as the invention herein disclosed may be applied to any of a number of other forms of collapsible top structures.

The specific top construction shown comprises a rear bow 11, an intermediate bow 12 and a front bow 13. The bows 11 and 12 are hinged at point 10, while the front bow 13 extends forwardly from the upper portion of the intermediate bow 12. The top is covered with fabric 14 which is indicated in dotted line and which extends from the vicinity of the windshield 8 over the several bows to the rear deck of the automobile. A top-operating arm 15 extends from the upper portion of the intermediate bow 12 rearwardly to an anchor point 16 which is fastened to the body of the car. Connected with the top-operating arm 15 are a number of auxiliary linkage arms 17, 18 and 19 which are pivotally connected together and which co-operate with the various bows described to complete the top mechanism. The hollow shaft 20, which is connected with the operating motor, is attached through a fork 46 to the link 17. This attachment is such that the shaft may pivot in a plane fore and aft of the car but is secured against axial rotation.

The various links, arms and bows are so arranged that when the shaft 20 and link 17 are raised, the various bows will rise to their extended positions and the top is up. When the shaft and associated link are lowered, the various bows fold up and the top lowers. A counterbalancing tension spring 21 extends from a fixed point on the body to an arm 22, which arm forms a continuation of the intermediate bow 12 and the rear bow 11. When the top is lowered, the spring 21 is tensioned so that when the top is being raised the energy stored in the springs assists the raising movement and makes the raising and lowering of the top relatively easy.

The parts so far described comprise a convertible top structure and no claim is made to it, per se, in this application. The present invention relates principally to the motor means for the top operation, which may be used with other appropriate linkage.

In order to raise and lower the top, a pair of electric motor assemblies 23 is provided, each being pivotally secured in a bracket 24. These brackets are secured to the floor of the car just rearwardly of the front seat and on the respective sides of the car. Inasmuch as the motors and the associated mechanism are identical in each case, but one of the assemblies will be described in detail.

The motor assembly 23 is built around the housing 25 which has integrally formed trunnions 26 pivotally engaging the bracket 24. Secured to the underside of the housing 25 by common bolts 44 are a ring gear 27, a seal plate 28 and a motor bracket 29. Bolted to the latter is an electric motor 30, the shaft 31 of which extends upwardly, has gear teeth thereon and serves as the sun gear of a planetary system comprising it, the ring gear 27 and the two planet gears 32.

The drive mechanism proper consists of the screw shaft 33 whose upper part is threaded as at 34 and whose lower half is integrally formed in a yoke 35. The shafts of the planet gears 32 are rotatably mounted in bearings 36 at opposite ends of the yoke. The portion of the screw shaft between the threads and the yoke is mounted in the ball-bearing assembly 37 and a thrust collar 38 is secured to it by pin 45 and transmits the thrust to the bearing assembly. The chamber 39, defined by the housing and the steel plate, is packed with grease during operation, insuring a quiet and long-lived performance.

The threaded portion 34 of the screw shaft engages a nut 40, which is affixed in the base of the hollow portion 41 of the shaft 20. Suitable electric connections are made to each motor, as indicated by the cables 42 leading to the switch control 43, by means of which the motors may be operated to lower or raise the top as desired.

As best seen in Figure 2, a resilient rubber washer 47, protected by a metal cap 48, surrounds the screw shaft and is interposed between the thrust collar 38 and the nut 40. The hole in the cap is large enough to clear the threads 34, while that in the washer is somewhat smaller, but the rubber is sufficiently resilient to allow its removal. This resilient means is most important. When the top is being lowered, it has considerable momentum, and, were this resilient means not provided, the nut 40 would drive against the thrust collar 38 with sufficient force to lock the thread. When this occurs, the starting torque of the motor is not sufficient to disengage the locked nut.

To counter this, various other expedients have been attempted, but none is as effective as a resilient means which progressively resists the forces. Further, when compressed, it is available where most beneficial to reduce starting torque requirements.

The upper end of the screw shaft 33 is provided with a pilot plug 49 which rides within the hollow portion 41 of the shaft 20. Figures 5 and 6 show the operation of the plug, the former when the top is lowered, the latter when it is up. The plug is chamfered as at 50 so that it will center itself and slide past the juncture of the shaft 20 and the fork 46.

Figure 6 shows the position when the top is up. A number of indentations 51 in the shaft 20 limit the highest position of the shaft. This prevents undue force being exerted on the roof bows and linkages after the top has been erected. Inasmuch as the weight of the top pushes the shaft 20 downwardly to disengage the pilot plug, the thread will not jam and a resilient buffer is not needed here.

In operation, the rotation of the motor shaft is transmitted through the planetary gearing system to the screw shaft at a greatly reduced rotational speed, for example, at a ratio of 12:1. The rotation of the screw shaft in combination with the nut 40 raises or lowers, depending upon the direction of rotation, the fork, and consequently the linkage attached thereto is raised or lowered.

The advantages of this construction are believed to be obvious. By using the housing as a basis of the device, and by utilizing the planetary reduction system, the entire apparatus is contained in a very small compass. The entire construction is linear throughout and hence avoids the difficulties incident to other systems of reduction, such as the worm and wheel in which the apparatus necessarily is much larger. It will be noted that the housing not only includes trunnions for the pivotal mounting, but also the thrust and rotational bearings; and that the ring gear, the seal plate and the motor bracket are supported from it by a single series of bolts.

The efficiency of the planetary drive far surpasses that of the usual worm gear; and a smaller—and hence much cheaper—motor will be found adequate. Limiting devices are provided in both directions and the locking of the threads, hitherto most troublesome, is entirely avoided.

The thrust of the screw shaft is transmitted through the bearing assembly to the housing and thence through the bracket to the floor of the vehicle. Thus, the gearing itself is entirely relieved from any stress on this score. The housing further forms a closed chamber in which the operating parts are continuously submerged in lubricant. Motors or screw shafts are readily interchangeable, where differing requirements of power or operation requires such changes. As an assembly, this apparatus has a particular advantage in that the ring gear, the oil seal plate, and the motor brackets are connected with the housing by the same set of fasteners. When it is desired to disassemble the apparatus, it is only necessary to disengage the fork, remove the lower bolts, knock out the pin which holds the thrust collar in place, and the yoke and its associated planetary gears may then be pulled downwardly.

The construction employing the fixed nut in the hollow fork in combination with the full length threaded shaft has a further advantage in that it avoids the use of swivels, telescopic rods, ball joints or other similar devices heretofore thought necessary. All moving parts are enclosed and hence protected from dirt or deterioration.

Some changes may be made in the arrangement, construction and combination of the various parts of my improved device without departing from the spirit of the invention, and it is my intention to cover by the claims such changes as may reasonably be included within the scope thereof.

I claim as my invention:

1. A device for raising and lowering an automobile top comprising, a housing having external pivot trunnions, a ring gear secured to the inner walls of said housing, a seal plate secured to said housing beneath said ring gear defining a chamber, a motor secured beneath said housing and said seal plate and having its shaft extending through said seal plate into said chamber, a gear attached to said motor shaft, planet gears meshing with said ring gear and said motor shaft gear, a drive shaft rotatably mounted in the upper portion of said housing aligned with said motor shaft, the lower end of said drive shaft being in the form of a yoke, said planet gears being rotatably mounted on said yoke, a nut on said drive shaft, a hollow sleeve fixedly engaging said nut, connecting means between said sleeve and the automobile top, said sleeve being pivotally secured by said connecting means to said automobile top whereby rotation of said sleeve is prevented, and means resiliently limiting the lowermost position of engagement between said nut and said housing.

2. A device for raising and lowering an automobile top comprising, a housing having extending trunnions adapted to engage a supporting bracket, said housing being generally in the form of a cone and having its vertex disposed upwardly, a ring gear secured in the interior of said housing, a sealing plate secured beneath said ring gear and defining a chamber with said housing, a motor secured beneath said housing and having its shaft transversing said sealing means, a gear on said motor shaft, a drive shaft rotatably mounted in a bearing assembly in the upper portion of said housing and aligned with said motor shaft, the lower portion of said drive shaft being formed into a yoke, planet gears rotatably mounted in said yoke and meshing with said ring gear and said motor shaft gear, the upper portion of said drive shaft being threaded, a nut engaging said threaded portion, said nut being secured in a hollow sleeve, said hollow sleeve having means connecting it to said automobile top for pivotal movement and preventing the axial rotation thereof, resilient means interposed between said housing and said sleeve, pilot means on the upper end of said drive shaft, and means in said sleeve to limit the relative movement of said sleeve and said drive shaft.

JOSEPH GALAMB.